United States Patent [19]

Asser et al.

[11] Patent Number: 5,422,912
[45] Date of Patent: Jun. 6, 1995

[54] ADAPTIVE WEAK SIGNAL IDENTIFICATION SYSTEM

[75] Inventors: Jason Asser, Northport, N.Y.; Chelsea R. Jones, Riverdale, Ga.; William Vojir, Seaford, N.Y.

[73] Assignee: Grumman Aerospace Corporation, Bethpage, N.Y.

[21] Appl. No.: 264,591

[22] Filed: Jun. 23, 1994

[51] Int. Cl.$^6$ .................... H03D 1/04; H03D 1/06; H04L 25/08
[52] U.S. Cl. ...................................... 375/350; 375/351
[58] Field of Search ............... 375/75, 10, 99, 104, 375/11, 12, 58; 324/77 R, 77 B

[56] References Cited

U.S. PATENT DOCUMENTS

5,260,974  11/1993  Johnson et al. .................. 375/99
5,339,463   8/1994  Hansen ............................ 455/213

*Primary Examiner*—Stephen Chin
*Assistant Examiner*—Tesfaldet Bocure
*Attorney, Agent, or Firm*—Scully, Scott, Murphy & Presser

[57] ABSTRACT

An adaptive weak signal identification system having a simple implementation which is capable of rapidly tracking weak signals with time varying frequencies in the presence of a strong interference signal. The system includes a first Fast Fourier Transform circuit for performing a Fast Fourier Transform on a discrete block of data points of an input data signal. A filter coefficient generator is coupled to the output of the Fast Fourier Transform circuit, and identifies the frequency of the strong interference signal, and then based thereon generates filter coefficients for a notch filter. A notch filter receives the generated filter coefficients, and further has the input data signal as an input, on which it performs a notch filtering operation to dramatically reduce the intensity of the interference signal. A second Fast Fourier Transform circuit then performs a Fast Fourier Transform on the output passed by the notch filter, and the output of the Fast Fourier Transform circuit is analyzed to identify the frequency of the weak signal of interest.

14 Claims, 5 Drawing Sheets

ADAPTIVE WEAK SIGNAL IDENTIFICATION SYSTEM

BACKGROUND OF THE INVENTION

1. Field of the Invention

The present invention relates generally to an adaptive weak signal identification system, and more particularly pertains to an adaptive weak signal identification system which operates on complex signals using a simple open loop interference frequency identification system.

2. Discussion of the Prior Art

Prior art approaches to an adaptive weak signal identification system have traditionally used a closed loop adaptive system, which has proven to have poor convergence and stability properties.

SUMMARY OF THE INVENTION

Accordingly, it is a primary object of the present invention to provide an improved adaptive weak signal identification system.

A further object of the subject invention is the provision of an improved adaptive weak signal identification system having a simple implementation which is capable of rapidly tracking weak signals with time varying frequencies in the presence of a strong interference signal.

The adaptive weak signal identification system of the present invention uses an open loop control approach, and is readily implemented with several commercially available circuit chips and components. Moreover, the adaptive weak signal identification system of the present invention has a great deal of flexibility in the choice of approaches, as explained in further detail hereinbelow.

In accordance with the teachings herein, the present invention provides an adaptive weak signal identification system (AWSIS) for identifying a weak signal of interest present in a given bandwidth along with a strong interference signal at a different frequency. The AWSIS system includes a first Fast Fourier Transform circuit for performing a Fast Fourier Transform on a discrete block of data points of an input data signal. A filter coefficient generator is coupled to the output of the Fast Fourier Transform circuit, and identifies the frequency of the strong interference signal, and then based thereon generates filter coefficients for a notch filter. A notch filter receives the generated filter coefficients, and further has the input data signal as an input, on which it performs a notch filtering operation to dramatically reduce the intensity of the interference signal. A second Fast Fourier Transform circuit then performs a Fast Fourier Transform on the output passed by the notch filter, and the output of the Fast Fourier Transform circuit is analyzed to identify the frequency of the weak signal of interest.

In greater detail, the adaptive weak signal identification system of the present invention further includes a delay circuit for delaying the input data signal for a given number of data cycles before passing it to the notch filter, such that the input signal arrives at the notch filter in synchronism with the generated filter coefficients from the filter coefficient generator. The delay circuit can be a clocked series of shift registers operating in a first in, first out mode. The adaptive weak signal identification system also preferably includes a first window function, having the input data signal as an input, for sampling a discrete block of data having a given number of data points. The window function multiplies the block of data by a function to weight the discrete block of data to eliminate artifacts created by sampling the discrete block of data before passing it to the first Fast Fourier Transform circuit. A second window function receives the output of the notch filter as an input, and samples a discrete block of data having a given number of data points. The second window function also multiplies the block of data by a function to weight the discrete block of data to eliminate artifacts created by sampling the discrete block of data before passing it to the second Fast Fourier Transform circuit. The notch filter preferably comprises a relatively simple two-tap, finite impulse response filter. The first Fast Fourier Transform circuit performs a Fast Fourier Transform on 16 data points, and the second Fast Fourier Transform circuit performs a Fast Fourier Transform on 64 data points.

BRIEF DESCRIPTION OF THE DRAWINGS

The foregoing objects and advantages of the present invention for an adaptive weak signal identification system may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
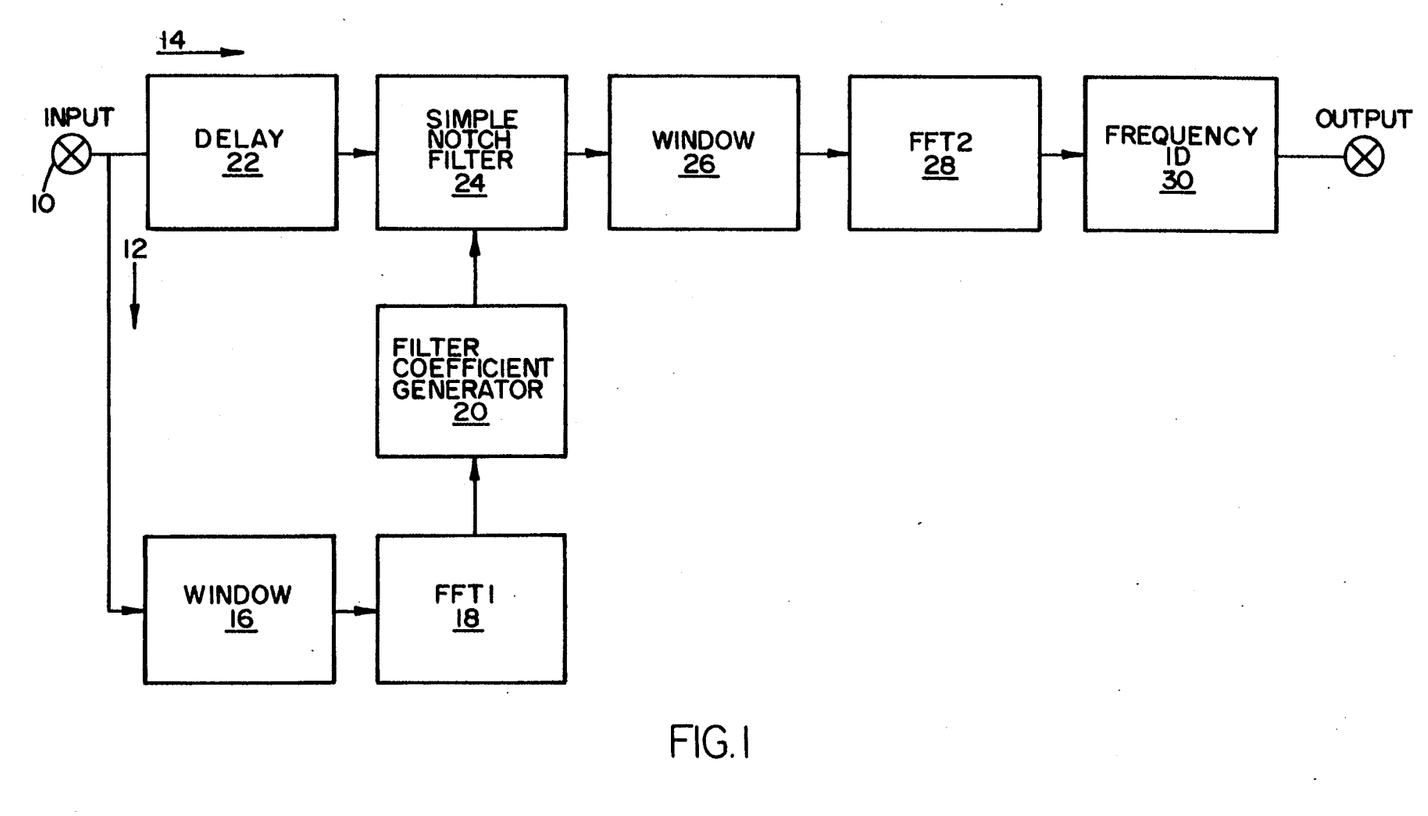
FIG. 1 illustrates a block diagram of a first preferred embodiment of an adaptive weak signal identification system constructed pursuant to the teachings of the present invention.

Referring to the drawings in detail, FIG. 1 illustrates a block diagram of a first preferred embodiment of an adaptive weak signal identification system (AWSIS) constructed pursuant to the teachings of the present invention. The adaptive weak signal identification system operates on complex signals presented at an input 10 by using a simple open loop interference frequency identification channel 12. The input data being processed at input 10 may typically be a digital data signal, as may be produced by a radar system which is attempting to track a weak signal, representing a target, in the presence of a much stronger noise signal also in the frequency band of the radar system, but displaced in frequency from the target signal of interest.

In FIG. 1, an input data signal at input 10 is processed via two parallel paths, with a first open loop processing path 12 first identifying the frequency of the strong interference signal, and then based thereon generating filter coefficients for a simple notch filter 24 in a second primary processing path 14. The filter coefficients are simple trigonometric functions of the interference frequency, and are used by the notch filter 24 to reduce the power of the interference signal. The primary processing path 14 first delays the input data signal by a delay circuit 22 for a given number of data cycles until the filter coefficients for the notch filter 24 can be generated. The input data signal is then filtered by the notch filter 24 to reduce the intensity of the interference signal. The notch filtered signal is then passed to a second Fast Fourier Transform circuit 28 which performs a FFT thereon to identify the lower power frequency of interest. The primary signal frequency is identified at the output of the second Fast Fourier Transform circuit by frequency ID circuit 30 by using a spectral generation technique.

In the first processing path 12, the input signal is first processed by a preprocessing window function 16 which samples a given number of data points in a data window. The window function 16 is a known data processing approach to eliminate artifact signals which are created by sampling a discrete number of data points. In the window function 16 the data points are multiplied by a convenient function to weight the input data, to minimize the artifacts created by sampling the given block of data, which has a discrete number of data points therein.

The sampled data in the sampled data block is then directed to the Fast Fourier Transform circuit 18 which takes a Fast Fourier Transform of the sampled input data to identify the frequencies of the signals present therein. As is known in the art, a Fast Fourier Transform circuit operates on a discrete number of signals or data points, which are generally a power of two, such as 8, 16, 32, 64, etc. The accuracy of the Fast Fourier Transform increases with the number of data signals, such that a Fast Fourier Transform with 64 input signals is more accurate than a Fast Fourier Transform with 16 input signals, but a penalty is paid for the greater accuracy in terms of processing complexity and speed.

In the embodiment of the adaptive weak signal identification system described herein, FFT1 18 takes the Fast Fourier Transform of 16 adjacent data points, as sampled and separated by the window function 18. The FFT1 circuit 18 generates the spectrum of the signal of interest along with any interference signals present in the given bandwidth. As is known in the art, the output of a Fast Fourier Transform circuit is produced over a number of outputs which is the same as the number of data points operated on by the circuit, see abscissa of sixteen outputs of FIG. 3, which must then be analyzed to determine the strength of the different frequency signals present therein. The complex output of FFT1 18 is passed through a magnitude detector 20 which identifies the frequency of the strongest signal, which is the interfering signal. The filter coefficients for the notch filter 24 are then obtained from a sine (sin $2\pi\beta$)/cosine (cos $2\pi\beta$) look-up-table (LUT) in generator block 20, and are passed to the simple notch filter 24.

Figure 4:
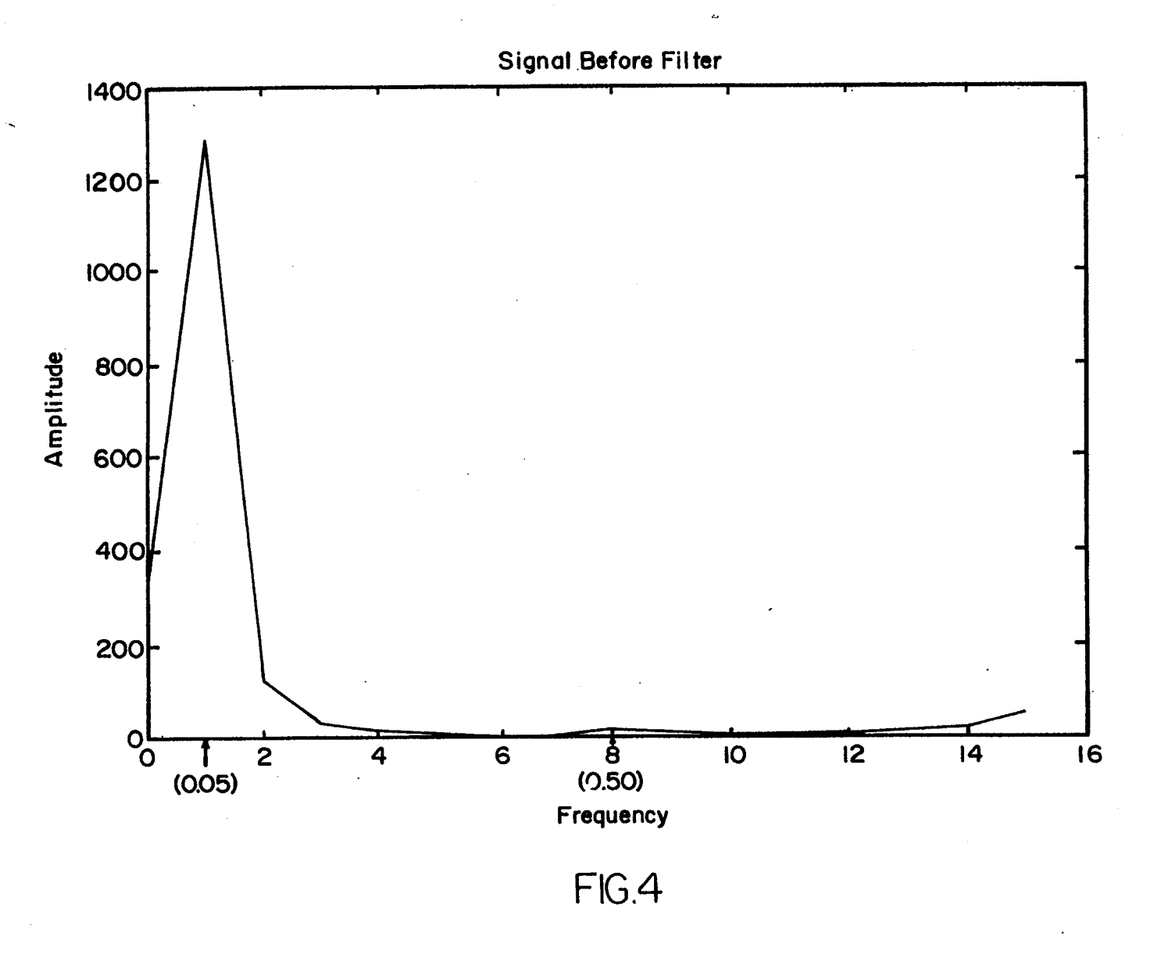
FIG. 4 illustrates the output of Fast Fourier Transform circuit 1 for an exemplary input data signal in which a strong interference signal present at a frequency 0.05 effectively masks a weak signal of interest present at a frequency 0.5.

FIG. 4 illustrates the output of Fast Fourier Transform circuit 18 (16 data points in the initial analysis) for an exemplary input data signal in which a strong interference signal present at a frequency 0.05, shown as the spike on the left side of FIG. 4, effectively masks a weak signal of interest present at a frequency 0.5, shown near 8 in the middle of FIG. 4. By way of explanation, in a graph of a Fast Fourier Transform, the abscissa (x axis) is normally shown as the number of data points taken in the Fast Fourier Transform (also known as the length of the Fast Fourier Transform), which for the example of FIG. 4 is sixteen. A particular frequency can be derived therefrom by dividing the x axis or abscissa values by the length of the transform. For the example, $0.05 = f/16$, and $f = 0.9$. Likewise, $0.50 = f/16$ and $f = 8$. The output of FFT1 18 is a signal as represented by FIG. 4, which shows the 16 transform points along the abscissa x axis, and the relative strength of the signal at different frequencies. In FIG. 4, a large noise signal exists at frequency 0.05, while the signal of interest is at frequency 0.50. The noise signal at frequency 0.05 has an amplitude approximately ten times greater than the signal of interest at frequency 0.50.

The approach of the present invention is to identify the frequency of the large noise signal (at 0.05), and then use a simple notch filter 24 to block or notch out the large noise signal. The notch filter 24 could be a fairly complex notch filter, as are available commercially, with a number of data storages and multiplications, or could be a fairly simple notch filter which performs a minimal number of data storages and multiplications, which is the approach of the present invention.

Figure 2:
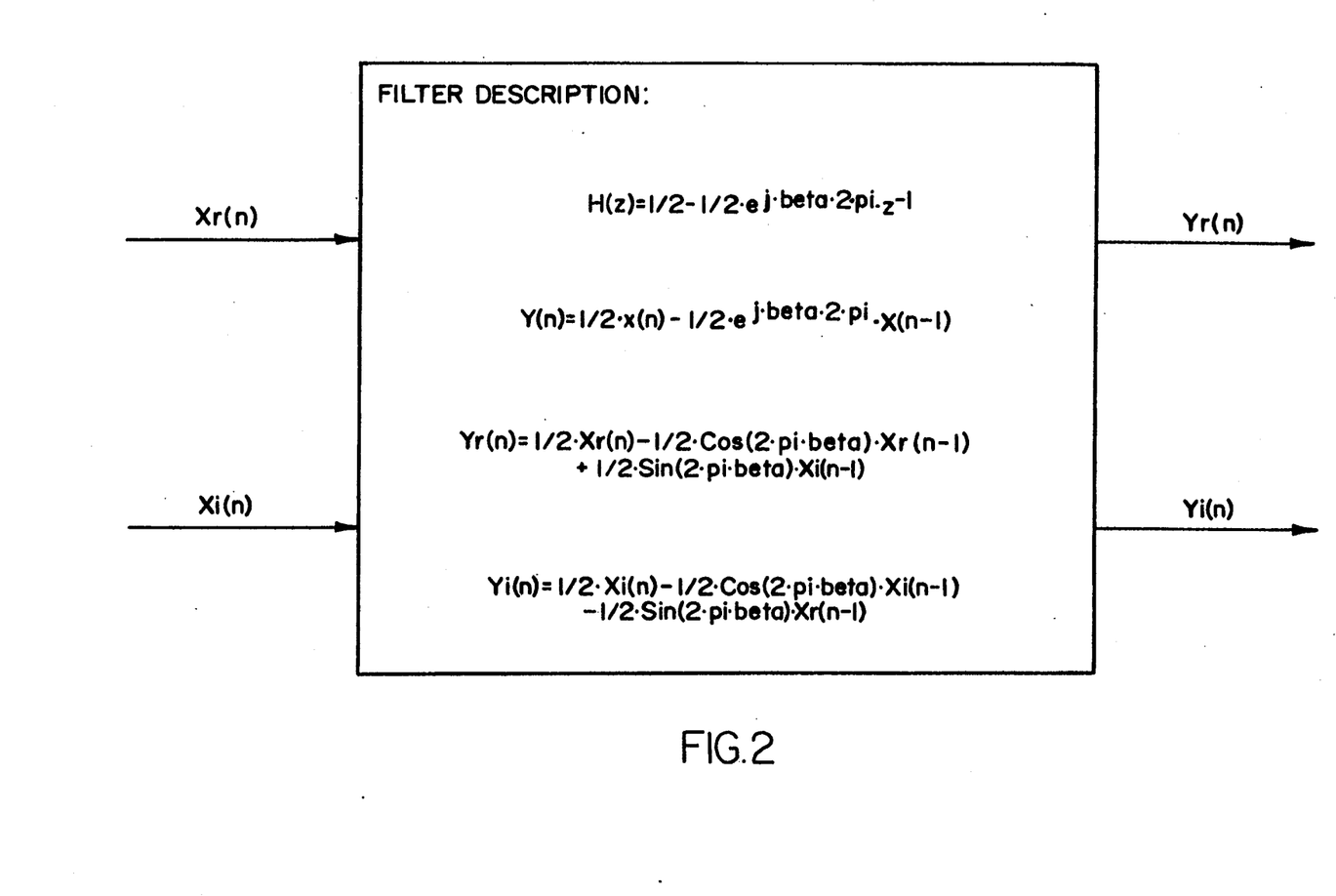
FIG. 2 illustrates an outline of a simple notch filter, using a Z-transform with a two-tap equation and its real time counterpart with real and imaginary parts.
Figure 3:
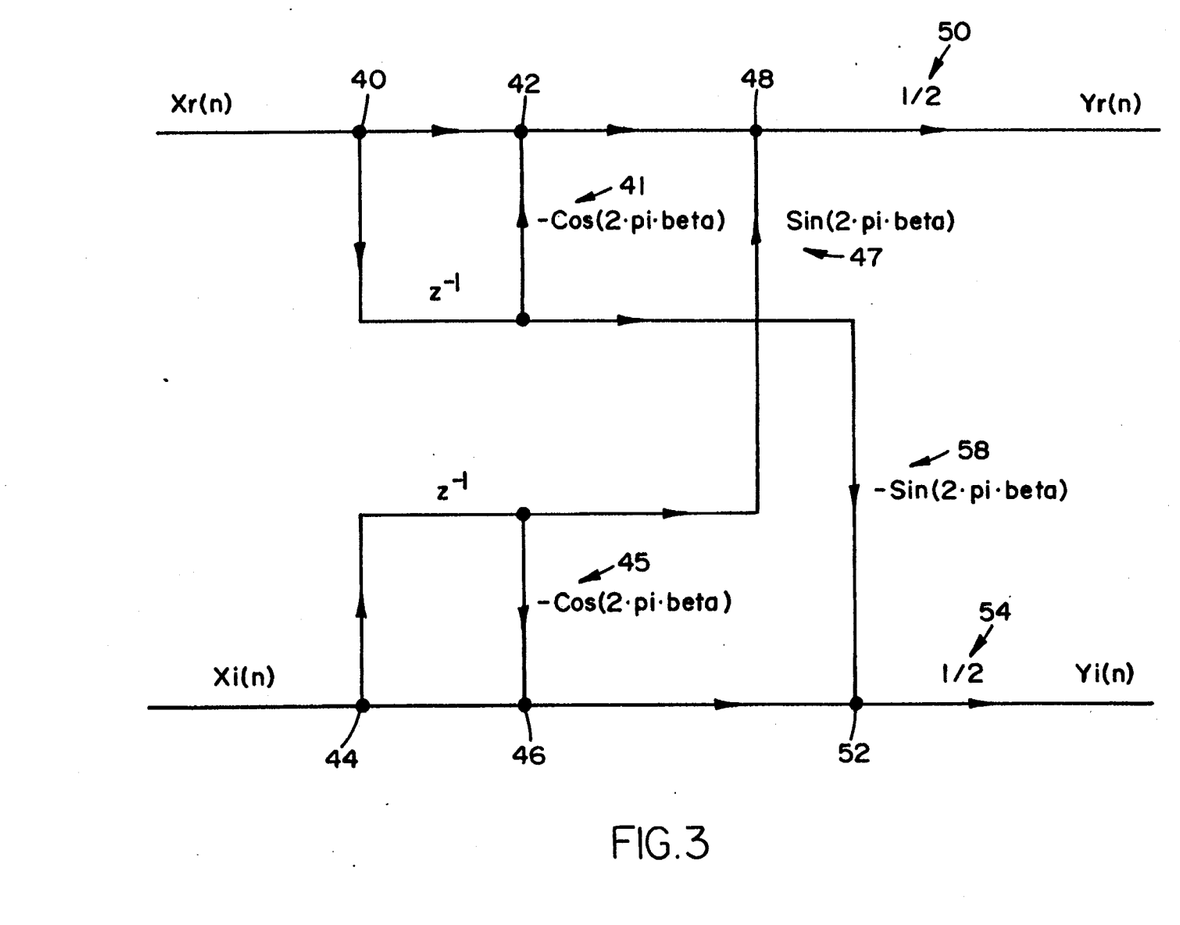
FIG. 3 is a traditional signal flowgraph of the simple notch filter of FIG. 2, and shows in a traditional signal flowgraph manner the processing in the notch filter of the real and imaginary parts of the input data signal.

FIG. 2 illustrates an outline of a simple notch filter 24, using a Z-transform with a two-tap equation and its real time counterpart with real and imaginary parts. FIG. 3 is a traditional signal flowgraph of the simple notch filter of FIG. 2, and shows in a traditional signal flowgraph manner the processing of the real and imaginary parts of the input data signal.

The digital data input signals are complex signals having real components, designated in FIG. 2 by Xr(n), and also having imaginary components, designated in FIG. 2 by Xi(n). The simple notch filter of FIG. 2 performs the multiplications, additions and delays indicated by the equations Yr(n) and Yi(n) to produce the output signals Yr(n) and Yi(n), wherein Yr(n) is the real component of the output data signal and Yi(n) is the imaginary component of the output data signal. In FIG. 2, H(z) represents a delay operation, and Y(n) represents the overall operation performed by the filter, which is further broken down in FIG. 2 into a computation of the real component Yr(n) and a computation of the imaginary component Yi(n).

As represented by the equations in FIG. 2, the angle beta ($\beta$) represents the frequency of the noise signal source, and the equations use the terms sin $2\pi\beta$ and cos $2\pi\beta$ in the multiplication operations. Accordingly, after FFT1 18 identifies $\beta$, the filter coefficient generator 20 generates the multiplier terms sin $2\pi\beta$ and cos $2\pi\beta$ for the notch filter 24 to use as multiplier coefficients therein.

FIG. 3 is a traditional signal flowgraph for the simple notch filter 24, and illustrates the logical performance of the steps of the equations of FIG. 2. In the signal flow graph, the nodes represent summing points, the $z^{-1}$ terms represent storage or delay terms, and the multiplying operations are illustrated by the multiplier terms adjacent to the arrows. The incoming complex signal has a real component Xr(n), illustrated at the top left, and an imaginary component Xi(n), illustrated at the bottom left. Tracing first the real component Xr(n), it is split at node 40, the lower component is delayed by one data cycle at $z^{-1}$, and the delayed signal is then multiplied by the component $-\cos(2.pi.beta)$ at 41, which is then recombined with the undelayed signal at node 42. Likewise, the imaginary component is split at node 44, delayed one data cycle at $z^{-1}$, and the delayed component is multiplied by $-\cos(2.pi.beta)$ at 45, and the delayed and multiplied component is then combined with the undelayed component at node 46. The delayed component of Xi(n) is also multiplied by $\sin(2.pi.beta)$ at 47, and then summed with the undelayed component of Xr(n) at node 48, and scaled by ½ at 50 to produce the output Yr(n), which has been formed by performing the data operations in FIG. 3 representing the equations in FIG. 2. Likewise, the delayed component of Xr(n), which is thus Xr(n−1), is multiplied at 58 by $-\sin(2.pi.beta)$, which is combined with the undelayed signal of Xi(n) at node 52 and scaled by ½ at 54 to form the output signal Yi(n), which has been formed by performing the data operations in FIG. 3 representing the equation of FIG. 2.

The simple notch filter of FIGS. 2 and 3 has only two data storages or delays and four multiplying operations. More complex notch filters could be used in other embodiments, with the more complex notch filters having more data storages and multiplications. However, a price is paid in terms of the complexity and speed of computation.

The output signals of the simple notch filter 24, Yr(n) and Yi(n), are then passed through a second window operation 26, which has basically the same function as the first window operation 16, and are passed to a second Fast Fourier Transform FFT2 28. In the second Fast Fourier Transform, the number of data points on which a Fast Fourier Transform operation is performed can vary as a power of two. In FFT2 28, 64 data points were chosen to increase the accuracy of the reading of the frequency of the weak signal of interest.

Figure 5:
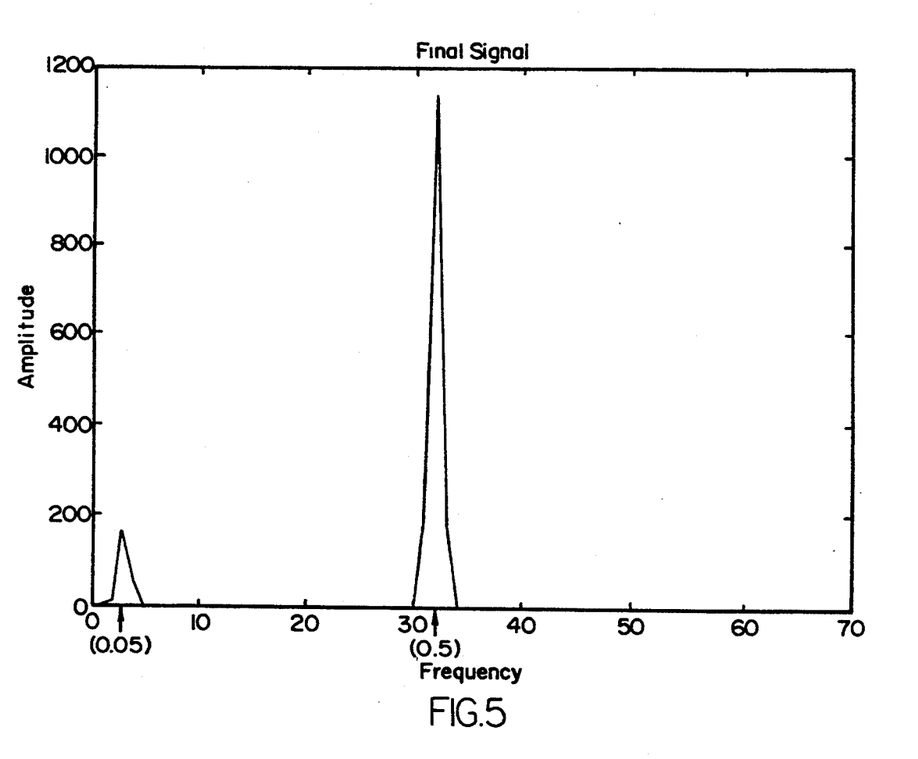
FIG. 5 illustrates the output of Fast Fourier Transform circuit 2 for the example of FIG. 4 after the strong interference signal at frequency 0.05 has been notch filtered therefrom, allowing the weak signal of interest to be prominently detected.

The signal, after passing through simple notch filter 24, has the high magnitude noise signal at e.g. f=0.05 notch filtered therefrom. Accordingly, FFT2 28 produces the frequency spectrum of the notch filtered signal to determine the frequency of the second strongest signal, which in the example is the signal of interest at e.g. f=0.50. The output of FFT2 28 is passed through a magnitude detector 30 which identifies the remaining strongest signal, which is the original weak frequency of interest. The output of FFT2 28 is represented in FIG. 5, which shows therein a 64 point Fourier conversion along the abscissa x. Note that the signal of interest now has a relative amplitude of greater than 1100, while the originally stronger noise signal now has a relative amplitude of less than 200. The output signal from FFT2 28, as shown in FIG. 5, is then analyzed in frequency identification circuit 30 to determine the actual frequency of the weak signal of interest.

Figure 6:
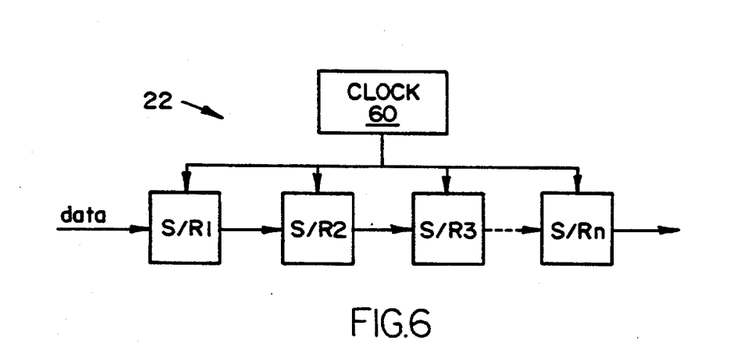
FIG. 6 illustrates a delay circuit which comprises a series of shift registers operated by a clock which delay and pass the data on a First-In, First-Out (FIFO) basis.

Referring back to FIG. 1, the function of delay 22 is to delay the input signal while window 16, FFT1 18, and filter coefficient generator 20 are performing their functions, such that the simple notch filter is ready to notch filter the strong noise signal, e.g. at f=0.05, when the delayed signal arrives at the input to the notch filter 24. Delay 22 can be simply a series of shift registers which delay and pass the data on a First-In, First-Out (FIFO) basis. The delay 22 can be a typical circuit as illustrated in FIG. 6 wherein a series of shift register S/R1, S/R2, S/R3 . . . S.Rn, operated by a clock 60, delay and pass the data on a First-In, First-Out (FIFO) basis.

The adaptive weak signal identification system of the present invention operates with an open loop approach in signal channel 12, and is readily implemented with standard commercially available circuit chips and components. Implementation of the system is made simple with three prepackaged chips. A GEC PLESSEY PDSP16330/A/B chip is a Pythagorean processor which computes the magnitude and phase outputs of the system. This chip is very useful in the steps defining the filter coefficients, and also in block 30 in identifying the frequency of the weak signal of interest. An PDSP16256/A chip can serve as the simple notch filter. The chip is a 16 tap filter with 32 bit accumulators, and accordingly the two-tap, two-delay simple notch filter described herein uses only a small portion of its capability. Raytheon Semiconductors' single chip TMC2310 can execute the FFT's that are required, and can also perform the window operations. These three chips will make up almost the entire system.

In summary, the window functions 16 and 26 are standard data processing functions to eliminate noise artifacts caused by taking a block of data of a given number of data points for each Fast Fourier Transform, 16 for window 16, and 64 for window 26. However, in alternative embodiments, the number of data points in each Fast Fourier Transform can be less or more, as long as it is a power of two. Moreover, as described hereinbelow, the output of each Fast Fourier Transform circuit can be made more accurate by performing an interpolation on the output. The delay 22 is a simple FI-FO shift register delay. The FFT blocks 18 and 28 are simple standard chips. The simple notch filter 24 is a simple notch filter standard chip, and could be more complex. The filter coefficient generator 20 can be a simple processor chip with a look-up table (LUT) memory for the sine and cosine functions.

The concept of the present invention was tested using a computer simulation designated MATLAB, which is a high order mathematical simulator and analysis program. An exemplary run of the AWSIS simulation is shown in FIGS. 4 and 5. The frequency of the weak signal was 0.5, and the frequency of the strong interference (10× greater amplitude) was 0.05. A data flow of the operation is given in TABLE 1 hereinbelow, which references FIG. 1. A listing of the program is given in TABLE 2 hereinbelow. The output of FFT1 18, FIG. 1, is shown in FIG. 4, and the output of FFT2 28, FIG. 1, is shown in FIG. 5. The results indicate good frequency identification for weak signals even though they are relatively close to a strong interference signal.

As can be seen in the first graph of the simulation in FIG. 4, the desired signal at frequency 0.5 is totally concealed. However, after processing is completed, the magnitude of the signal is much greater than that of the interference signal, making the weak signal easily detectable.

Each block has vectors coming in and going out. This list along with the source code to the simulation should make it very easy to break the entire system down into small blocks.

TABLE 1

| Block 1 | Input v1, | Original signal |

TABLE 1-continued

| | | |
|---|---|---|
| | Output v1, | Original signal |
| Block 2 | Input v1, | Original signal |
| | Output v2, | Windowed signal |
| Block 3 | Input v2, | Windowed signal |
| | Output v3, | Output of first FFT (e.g. 16 point) |
| Block 4 | Input v3, | FFT output |
| | Output beta, | Frequency to be removed by filter |
| Block 5 | Input v1, | Original signal |
| | Output Y, | Notched vector |
| Block 6 | Input Y, | Notched vector |
| | Output v4, | Windowed, notched vector |
| Block 7 | Input v4, | Windowed, notched vector |
| | Output v5, | Output of second FFT (e.g. 64 point) |
| Block 8 | Input v6, | FFT2 output squared |
| | Output final, | Final desired frequency |

The following program was run during the test with MATLAB. The program is relatively straightforward in determining the signals V1 through V6, generating the first window and FFT, generating the filter coefficients, plotting the original signal, simulating the notch filter, generating the second window and FFT to determine the weak frequency, and plotting the signals. FIGS. 4 and 5 herein were plotted running the program during the simulated test with MATLAB.

TABLE 2

```
%AWSIS Simulation
num=64;
vs=0:15;
vs1=0:63;
A=10;
f=input('Frequency of noise? ')
F=input('Frequency to detect? ')
z=0:num−1;
v1=A*exp(2*pi*j*f*z)+exp(2*pi*j*F*z); %Input Signal
%Window Vector Generation
w=0.54−0.46*cos(2*pi*z/(num−1));
%First Window and FFT to determine frequency of noise
v2=w.*v1;
v3 = fft(v2,16);
%Filter Coefficient generator
coff=v3.*conj(v3);
[maxmag,ind]=max(coff);
beta=(ind−1)/16;    %beta and ind used in filter
%Graph of original signal
plot(vs,coff)
title('Signal Before Filter');
ylabel('Amplitude');
xlabel('Frequency');
pause
%Notch Filter
b=[.5 −.5*exp(2*pi*j*beta)];
a=[1];
Y=filter(b,a,v1);
%Second Window and FFT to determine weak frequency
v4=w.*Y;
v5=fft(v4,64);
v6=v5.*conj(v5);
%Frequency ID Graph
plot(vs1,v6)
title('Final Signal')
ylabel('Amplitude');
xlabel('Frequency');
end
```

The AWSIS as described herein is quite general. Additional precision can be obtained by executing longer FFT's without changing the fundamental operation. A simple interpolator could be added to the filter coefficient generator or the Frequency ID subsystems as an alternative to increasing the transform length for improving the precision. However, in the described preferred embodiment, these enhancements were not specifically included to keep the overall design and implementation relatively simple. Different notch filters can be substituted for the simple one described herein. The simple notch filter frequency response can be flattened by using appropriate polynomial amplitude change functions without altering the overall design.

While several embodiments and variations of the present invention for an adaptive weak signal identification system are described in detail herein, it should be apparent that the disclosure and teachings of the present invention will suggest many alternative designs to those skilled in the art.

What is claimed is:

1. An adaptive weak signal identification system for identifying a weak signal of interest present in a given bandwidth along with a strong interference signal which is at a different frequency, comprising:
   a. a first Fast Fourier Transform circuit for performing a Fast Fourier Transform on a discrete block of data points of an input data signal;
   b. a filter coefficient generator means, coupled to the output of said Fast Fourier Transform circuit, for identifying the frequency of the strong interference signal, and for generating filter coefficients for a notch filter based upon the frequency of the strong interference signal;
   c. said notch filter, having said generated filter coefficients as an input and further having the input data signal as an input, for performing a notching filtering operation on the input data signal;
   d. a second Fast Fourier Transform circuit, coupled to the output of the notch filter, for performing a Fast Fourier Transform on the output of said notch filter;
   e. means, coupled to the output of the Fast Fourier Transform circuit, for identifying the frequency of the weak signal of interest.

2. An adaptive weak signal identification system as claimed in claim 1, further including a delay means for delaying the input signal for a given number of data cycles before passing the input signal to the notch filter, such that the input signal arrives at the notched filter in synchronism with the generated filter coefficients from the filter coefficient generator means.

3. An adaptive weak signal identification system as claimed in claim 2, wherein said delay means comprises a clocked series of shift registers operating in a first in, first out mode.

4. An adaptive weak signal identification system as claimed in claim 1, further including a window function, having the input data signal as an input, for sampling a discrete block of data having a given number of data points and for multiplying the block of data by a function to weight the discrete block of data to eliminate artifacts created by sampling the discrete block of data before passing its output to said first Fast Fourier Transform circuit.

5. An adaptive weak signal identification system as claimed in claim 1, further including a window function, having the output of said notch filter as an input, for sampling a discrete block of data having a given number of data points and for multiplying the block of data by a function to weight the discrete block of data to eliminate artifacts created by sampling the discrete block of data before passing its output to said second Fast Fourier Transform circuit.

6. An adaptive weak signal identification system as claimed in claim 1, wherein said notch filter comprises a relatively simple two-tap, finite impulse response filter.

7. An adaptive weak signal identification system as claimed in claim 1, wherein said first Fast Fourier Transform circuit performs a Fast Fourier Transform on 16 data points.

8. An adaptive weak signal identification system as claimed in claim 1, wherein said second Fast Fourier Transform circuit performs a Fast Fourier Transform on 64 data points.

9. An adaptive weak signal identification system as claimed in claim 2, further including a window function, having the input data signal as an input, for sampling a discrete block of data having a given number of data points and for multiplying the block of data by a function to weight the discrete block of data to eliminate artifacts created by sampling the discrete block of data before passing its output to said first Fast Fourier Transform circuit.

10. An adaptive weak signal identification system as claimed in claim 9, further including a window function, having the output of said notch filter as an input, for sampling a discrete block of data having a given number of data points and for multiplying the block of data by a function to weight the discrete block of data to eliminate artifacts created by sampling the discrete block of data before passing its output to said second Fast Fourier Transform circuit.

11. An adaptive weak signal identification system as claimed in claim 10, wherein said notch filter comprises a relatively simple two-tap, finite impulse response filter.

12. An adaptive weak signal identification system as claimed in claim 11, wherein said first Fast Fourier Transform circuit performs a Fast Fourier Transform on 16 data points.

13. An adaptive weak signal identification system as claimed in claim 12, wherein said second Fast Fourier Transform circuit performs a Fast Fourier Transform on 64 data points.

14. An adaptive weak signal identification system as claimed in claim 13, wherein said delay means comprises a clocked series of shift registers operating in a first in, first out mode.

* * * * *